(12) United States Patent
Nakano

(10) Patent No.: US 6,394,668 B1
(45) Date of Patent: May 28, 2002

(54) SHUTTER FOR CAMERA

(75) Inventor: Yoichi Nakano, Narashino (JP)

(73) Assignee: Seiko Precision Inc. (JP)

( * ) Notice: Subject to any disclaimer, the term of this patent is extended or adjusted under 35 U.S.C. 154(b) by 0 days.

(21) Appl. No.: 09/539,140

(22) Filed: Mar. 30, 2000

(30) Foreign Application Priority Data

Mar. 31, 1999 (JP) .......................................... 11-092939
Apr. 20, 1999 (JP) .......................................... 11-111797

(51) Int. Cl.[7] ................................................ G03G 9/03
(52) U.S. Cl. ........................ 396/464; 396/470; 396/493
(58) Field of Search ................................. 396/464, 478, 396/469, 493, 463, 470, 452, 455, 457; 310/68 R, 46, 268, 266, 254, 199, 179

(56) References Cited

U.S. PATENT DOCUMENTS

| | | | | |
|---|---|---|---|---|
| 4,390,262 A | * | 6/1983 | Hirohata et al. | 396/449 |
| 4,415,252 A | * | 11/1983 | Hirohata et al. | 396/464 |
| 4,504,132 A | * | 3/1985 | Martin et al. | 396/132 |
| 4,658,162 A | * | 4/1987 | Koyama et al. | 310/68 |
| 4,804,574 A | * | 2/1989 | Osawa et al. | 428/209 |
| 4,922,145 A | * | 5/1990 | Shtipelman | 310/49 |
| 5,229,696 A | * | 7/1993 | Golker et al. | 318/561 |

* cited by examiner

*Primary Examiner*—David M. Gray
(74) *Attorney, Agent, or Firm*—Adams & Wilks

(57) ABSTRACT

A shutter for a camera has a sector driven by a movable board having plural spiral-shaped coil patterns concentrically arranged thereon for generating a repulsive or attractive magnetic field with respect to fixed permanent magnets or coils confronting the movable board. A desired generated magnetic force can be obtained by setting the number and winding direction of the coils and combining coils in a desired manner. A drive circuit is connected to the coils for controlling the supply of electricity thereto such that repulsive magnetic forces are generated while opening the shutter and attractive magnetic forces are generated while closing the shutter.

20 Claims, 11 Drawing Sheets

(a)

(b)

(a)

(b)

(a)

(b)

(a)

(b)

SHUTTER FOR CAMERA

BACKGROUND OF THE INVENTION

1. Field of the Invention

The present invention relates to a shutter for a camera.

2. Description of the Related Art

Although a shutter for a camera is available in various styles and types, as one type there is a shutter for a camera which operates such that an aperture of a lens is closed by closing a plurality of sheets of sectors and a hole for exposure is opened at a central portion thereof by pivoting the sectors. According to opening and closing operation of the sectors, a base portion of each of the sectors is pivotably supported, a drive pin of a sector drive lever is engaged with a drive hole portion provided at a position apart from the support point by a predetermined distance and the sector can be opened by pivoting the lever and can return to an original position by spring force.

FIG. 11 shows the principle of a shutter drive apparatus for operating two sheets of sectors to open and close according to a conventional technology and an outline of a constitution of the shutter drive apparatus is as follows.

Two sheets of sectors 83 are attached between a shutter base plate 81 and a rear plate 82 to thereby enable to open and close lens apertures 81$a$ and 82$a$. The shutter base plate 81 and the rear plate 82 can be fixed to be apart from each other at an interval capable of installing the sectors pivotably by screws 84.

Respective elements of the shutter drive apparatus are provided on a front face (upper face of FIG. 11) of the shutter base plate 81. First, a sector drive lever 85 formed with projected portions on both sides of a plate-like member formed substantially in a heart-like shape, is provided at a vicinity of a central portion of the upper face of the shutter base plate 81. According to the sector drive lever 85, a bearing portion 85$a$ provided to project at a pivotal center portion thereof is fitted to a support shaft portion 81$b$ provided to project from the upper face of the shutter base plate 81. A sector drive pin 85$b$ is provided straight down from a vicinity of a top portion of a lower face of the sector drive lever 85 and the pin passes through an arc groove portion 81$c$ formed in the shutter base plate and is engaged with an oval groove portion 83$a$ of the sector. Further, respective sectors constituting the shutter 83 are pivotably supported by pivotal center holes 83$b$ and support pins 81$d$ provided to project from a rear face of the shutter base plate. The respective support pins 81$d$ stably support respectively the sector 83 by being engaged with through holes 82$b$ provided at the rear plate 82.

The sector drive lever 85 is biased in the counterclockwise direction by a spring 86, and thereby, the shutter 83 is biased in a direction of closing the shutter 83. A drive coil 87 constituted by winding a coil in a spiral shape and solidifying the coil in a doughnut-like shape, is fixedly attached to a rear face of an ear portion 85$c$ formed on a side of the sector drive lever 85 opposed to a position attached with the spring 86. One lead wire 87$a$ of the coil 87 is connected to an outer peripheral portion of the coil and the other lead wire 87$b$ is connected to an inner peripheral portion thereof. When electricity is conducted from a drive circuit 88 to the coil 87, there is produced magnetic flux an upper side of which constitutes an S pole and a lower side of which constitutes an N pole, for example. Conduction of electricity to the coil 87 can be controlled by the drive circuit 88 to thereby enable to arbitrarily open and close the shutter.

The drive coil 87 is also pivoted centering on the support shaft portion 81$b$ by pivoting the sector drive lever 85 and a pair of permanent magnets 89 and 90 in a shape of a thin plate are provided on a pivotal locus of the center of the coil. These permanent magnets are fixedly attached onto the upper face of the shutter base plate 81 and the one magnet 89 is disposed on a forward side of the pivotal locus of the coil 87 in the clockwise direction at an initial position and is pasted such that an upper face thereof constitutes an N pole. In contrast thereto, the other permanent magnet 90 is disposed on a rearward side of the pivotal locus and is pasted such that an upper face thereof constitutes an S pole.

Since the constitution is constructed in this way, when magnetic force with the S pole on a downward side is produced in the coil by conducting controlled electricity from the drive circuit 88 to the coil 87, by the operation of the magnetic force, a suction force is operated between the drive coil 87 and the magnet 89 on the front side and a repulsion force is operated between the drive coil 87 and the magnet 90 on the rear side to thereby move the drive coil 87 in the clockwise direction and pivot the sector drive lever 85 in the same direction. Thereby, the sector 83 is opened and an exposable state is brought about. Next, when electricity is made to stop conducting to the drive coil 87, the magnetic force is extinguished, and therefore, the sector drive lever 85 returns to the original position by a spring 86 and the shutter is closed.

According to the shutter drive apparatus of the conventional example, the sector drive lever 85 and the drive coil 87 are disposed on different planes and accordingly, there poses a problem in which areas on the planes become large. Further, in addition thereto, the sector drive lever 85, the drive coil 87 and the permanent magnets 89 and 90 are provided at respectively different heights and accordingly, there poses a problem in which a thickness of the shutter becomes large by that amount. Furthermore, the sector drive lever 85 is pivoted by pivoting the drive coil 87 per se and accordingly, there poses a problem in which large kinetic energy is needed and accordingly, power consumption is increased.

SUMMARY OF THE INVENTION

In order to resolve the above-described problems, according to a shutter for a camera of the invention, a fixed printed board in correspondence with the shutter base plate in the conventional technology and a movable printed board in correspondence with the sector drive lever in the conventional technology, are provided respectively with an optical axis as a reference, a plurality of coil patterns in a spiral shape are arranged at each of the printed boards and a plurality of sectors are made openable and closable by using electromagnetic force produced by conducting electricity to the plurality of coil patterns to thereby realize small-sized formation and high function formation of the shutter.

According to the shutter of the invention, the respective printed boards and a sector ring are constructed so as to be laminated centering on the optical axis and accordingly, areas of the shutter are reduced while the drive coil occupying a large space in the conventional technology is replaced by the coil patterns and accordingly, the shutter can be thinned also in view of a thickness thereof to thereby promote downsizing of the shutter.

When current controlled by a drive circuit is flowed to the coil patterns arranged on the fixed printed board, depending on a way of winding the coil patterns in the spiral shape, electromagnetic force of an N pole or an S pole is produced respectively on a fixed printed board face and a movable printed board face opposed to each other.

When polarities of both are constituted by a same polarity in directions opposed to each other and initial positions of the coil patterns of the movable printed board are set at positions apart from positions of the fixed printed board and shifted in an advancing direction by a predetermined angle, electromagnetic forces by the two coil pattern produced by conducting electricity from the drive circuit repel each other to pivot the movable printed board in a direction of opening the sectors. When electricity is made to stop conducting to the coil patterns by the drive circuit, the electromagnetic forces of the two printed boards are extinguished, and accordingly, the sector drive lever returns to an original position by a biasing force of a spring and the shutter is closed.

Further, since the coil patterns are formed in the spiral shape, the respective coil patterns can be connected to each other by installing connecting portions of the coil patterns to detour on other faces where connection portions of patterns are not opposed to each other by utilizing through holes perforated in the printed boards such that electricity is conducted to inner end portions thereof.

With regard to drive force in closing the sectors, by controlling a direction of conducting electricity to the coil patterns on either of the printed boards by the drive circuit, a time period of closing the sectors can also be shortened by utilizing, in addition to the biasing force of the spring, attractive force produced by making polarities on the opposed faces different from each other.

Further, according to other means, by arranging a spiral pattern in the same way of winding in view from the same direction to both of the printed boards as the coil patterns of the respective printed boards, there can be produced electromagnetic force having an intensity twice as much as that in the case in which the spiral patterns are arranged only on faces thereof on one side.

Further, according to other means, by alternately arranging spirals of the respective coil patterns in ways of winding in directions reverse to each other, the drive force is increased by simultaneously effecting repulsion and attraction operation.

Further, according to other means, in place of the above-described coil pattern of the fixed printed board, permanent magnets are arranged and the movable printed board is made pivotable by magnetic force of the permanent magnets and by electromagnetic forces produced the coil patterns of the movable printed board. Although the thickness of the shutter is increased by an amount of the thickness of the permanent magnet, strong magnetic force is provided and accordingly, the sectors can be opened by large drive force. When the permanent magnets are arranged in this way, basically, a surface of any one of the permanent magnets is constituted by the same polarity. In contrast thereto, when the coil patterns of the movable printed board are arranged to constitute polarities alternately different from each other, the coil patterns in correspondence thereto are arranged such that polarities thereof differ from each other. Further, also in the case of arranging the permanent magnets in place of the fixed printed board, drive force by strong electromagnetic force can be provided by arranging the coil patterns on two faces of the movable printed board.

BRIEF DESCRIPTION OF THE DRAWINGS

FIGS. 3A, 3B and 3C are perspective views showing a way of winding spirals and a positional relationship of coil patterns according to the first embodiment in which FIG. 3A shows a fixed printed board, FIG. 3B shows a movable printed board at an initial position and FIG. 3C shows the movable printed board after having been pivoted;

FIGS. 4A and 4B show operation of the first embodiment in which FIG. 4A is an explanatory view showing a positional relationship at an initial state of the two printed boards and FIG. 4B is an explanatory view showing polarities of respective coil patterns and a positional relationship after having been pivoted;

FIGS. 5A and 5B are characteristic diagrams showing electricity conduction time period and a shutter aperture according to the first embodiment in which FIG. 5A shows a case of one direction electricity conduction and FIG. 55 shows a case of two directions electricity conduction;

FIGS. 8A and 8B show operation of the third embodiment in which FIG. 8A is an explanatory view showing a positional relationship at an initial state of two printed boards and FIG. 8B is an explanatory view showing polarities of the respective coil patterns and a positional relationship after having been pivoted;

FIGS. 10A and 10B show operation of the fourth embodiment in which FIG. 4A is an explanatory view showing a positional relationship at an initial state of two printed boards and FIG. 4B is an explanatory view showing polarities of respective coil patterns and a positional relationship after having been pivoted.

DETAILED DESCRIPTION OF THE PREFERRED EMBODIMENTS

Figure 1:
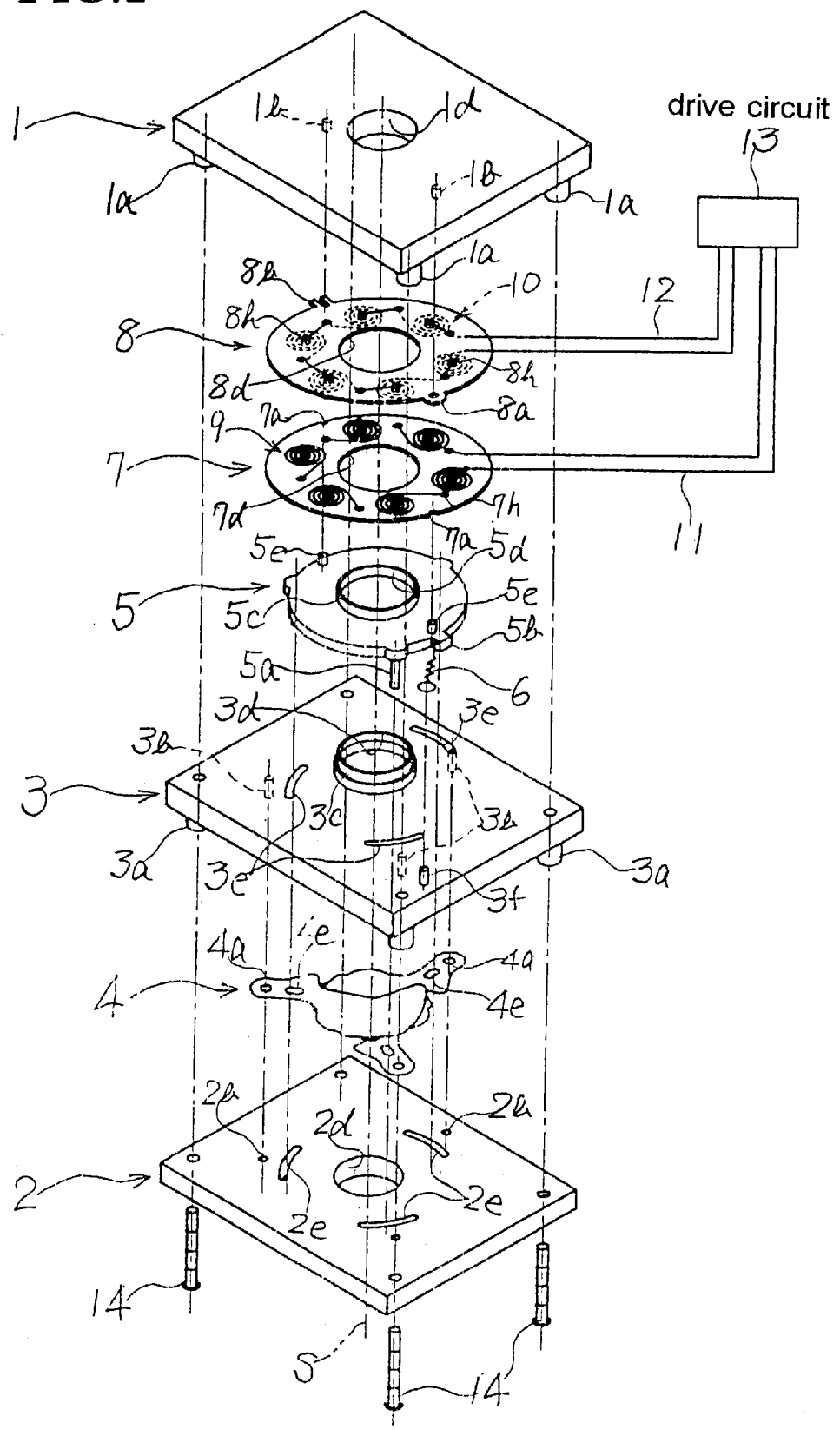
FIG. 1 is a disassembled perspective view of an initial state showing a constitution of a first embodiment.

A shutter for a camera according to the invention is constituted by a fixed printed board held by a supporting plate provided with an opening, a movable printed board confronting one face of the fixed printed board and provided on a shutter base plate provided with an opening pivotably and biased in one direction by a biasing member and a plurality of sectors provided openably and closably by the movable printed board.

The fixed printed board and the movable printed board are provided with coil patterns in a spiral shape disposed substantially in a concentric shape relative to a center of an optical axis of the openings and the coil patterns maybe connected to a drive circuit for controlling conduction of electricity to the coil patterns.

The respective coil patterns may be arranged on faces of the respective printed boards confronting each other and connecting portions for connecting specific terminal portions with the coil patterns and connecting the respective coil patterns may be provided on faces of the printed boards which are not confronting each other via through holes.

Further, it is preferable that the respective coil patterns are arranged at equal intervals on the faces of the respective printed boards confronting each other and in an initial state reference positions for arranging the coil patterns on the movable printed board may be deviated from positions of the coil pattern of the fixed printed board in an advancing direction by a predetermined angle such that a repulsion force is effectively operated.

It is preferable that the drive circuit is set to conduct electricity to the coil patterns of the two printed boards such that magnetic forces repel each other in a time zone of opening the shutter and to conduct current thereto such that the magnetic forces attract each other in a time zone of closing the shutter.

Further, it is preferable that the respective printed boards comprise multilayer printed boards each having at least two or more faces and a drive force of opening and closing the sectors is increased by arranging the coil patterns having a same way of winding the coil patterns in view from a same direction on at least two or more of pattern faces.

It is preferable according to other means that the drive force is achieved to intensify by arranging the coil patterns of the respective printed boards constituting a contiguous position relationship by ways of winding in directions reverse to each other.

Further, the fixed printed board may be omitted by arranging permanent magnets on the supporting plate in place of the fixed printed board and coil patterns of the fixed printed board to thereby achieve a reduction in a number of parts and downsizing thereof. In this case, when contiguous ones of the coil patterns of the printed board are arranged in ways of winding in directions reverse to each other, repulsion force and attractive force may effectively operated by alternately arranging N poles and S poles at the permanent magnets. Further, also in this case, it is preferable to increase the drive force of opening and closing the shutter by arranging the coil patterns on two faces of the movable printed board.

Further, it is preferable to control a time period of conducting electricity to the coil patterns in accordance with brightness of an object.

EXAMPLES

An explanation will be given of embodiments according to the invention in reference to the drawings as follows.
(First Embodiment)

FIG. 1 shows a state in which sectors are closed with regard to a shutter comprising a basic constitution of the invention as a first embodiment by a disassembled perspective view. Further, in the following explanation, an upper side of a drawing is expressed as "upper". The shutter is constituted by arranging an upper plate 1 constituting a supporting plate on one side (upper face), arranging a lower plate 2 on the other side (lower face) and arranging respective constituent elements between the two plates in a laminated state.

A shutter base plate 3 is interposed between the upper plate 1 and the lower plate 2 and three sheets of sectors 4 are provided between the shutter base plate 3 and the lower plate 2. An interval is provided between the lower plate 2 and the shutter base plate 3 such that the sectors 4 can pivotally be moved, the interval being provided by spacers 3a formed on a lower face of the shutter base plate. Further, the respective sectors 4 are pivotably supported by penetrating support pins 3b provided to project from the lower face of the shutter base plate 3 through support holes 4a of the respective sectors and inserting the support pins 3b to insert through support hole portions 2b perforated in the lower plate 2.

The above-described respective plates are provided with openings 1d, 2d and 3d respectively along an optical axis S.

An upper face of the shutter base plate 3 is formed with a cylindrical shaft portion 3c extended upward from a surrounding of the opening 3d. An opening 5d of a sector ring 5 in a ring-like shape is pivotably fitted to the shaft portion 3c.

Three sector drive pins 5a (only one is illustrated) are provided to hang down from an outer peripheral portion of a rear face of the sector ring 5 at equal angular intervals. The sector drive pins 5a can be engaged with arc grooves 2e provided at the lower plate 2 by penetrating arc grooves 3e provided at the shutter base plate 3 and oval grooves 4e provided at the respective sectors 4. Accordingly, when the sector ring 5 is reciprocally pivoted in a predetermined angular range, a lens aperture 4d can be opened and closed by pivoting the respective sectors (refer to FIG. 2).

Further, a projection 5b formed at an outer peripheral portion of the sector ring 5 is attached with one end of a spring 6 as a biasing member the other end of which is supported by a pin 3f provided to project from the upper face of the shutter base plate 3 to thereby bias the sectors 4 in a closing direction relative to the sector ring.

An upper face of the sector ring 5 is formed with a receiving portion 5c in a cylindrical shape extended upwardly along the opening 5d and the receiving portion is fitted with an opening 7d of a movable printed board 7 formed in a doughnut-like shape.

According to the movable printed board 7, not only the lens opening 7d is fitted to the receiving portion 5c of the sector ring while notched portions 7a formed at two locations of an outer peripheral portion are engaged with fixing pins 5e provided to project from the upper face of the sector ring to thereby enable to integrally pivot two members of the movable printed board 7 and the sector ring 5.

A fixed printed board 8 is provided on a lower face of the upper plate 1 at a position opposed to the movable printed board 7. The fixed printed board 8 is fixed to the upper plate such that the fixed printed board 8 is not rotatable relative to the upper plate by engaging engaging portions 8a and 8b formed at an outer peripheral portion thereof with fixing pins 1b provided to hang down from the lower face of the upper plate 1. Further, the movable printed board 7 and the fixed printed board 8 can be maintained at a predetermined interval therebetween by providing spacer means, not illustrated.

Coil patterns 9 and 10, mentioned later, are formed on an upper face of the movable printed board 7 and a lower face of the fixed printed board B. Specific terminal portions 9t and 1ot of the respective coil patterns are connected to a drive circuit 13 respectively via lead wires 11 and 12.

The sector ring 5, the spring 6, the movable printed board 7 and the fixed printed board 8 are disposed in a laminated state within an interval provided between the upper plate 1 and the shutter base plate 3 by spacer portions 1a provided to hang down from the lower face of the upper plate 1. Further, in integrating the shutter, the shutter can integrally be fixed by four pieces of screws 14 (only three pieces are illustrated).

Figure 2:
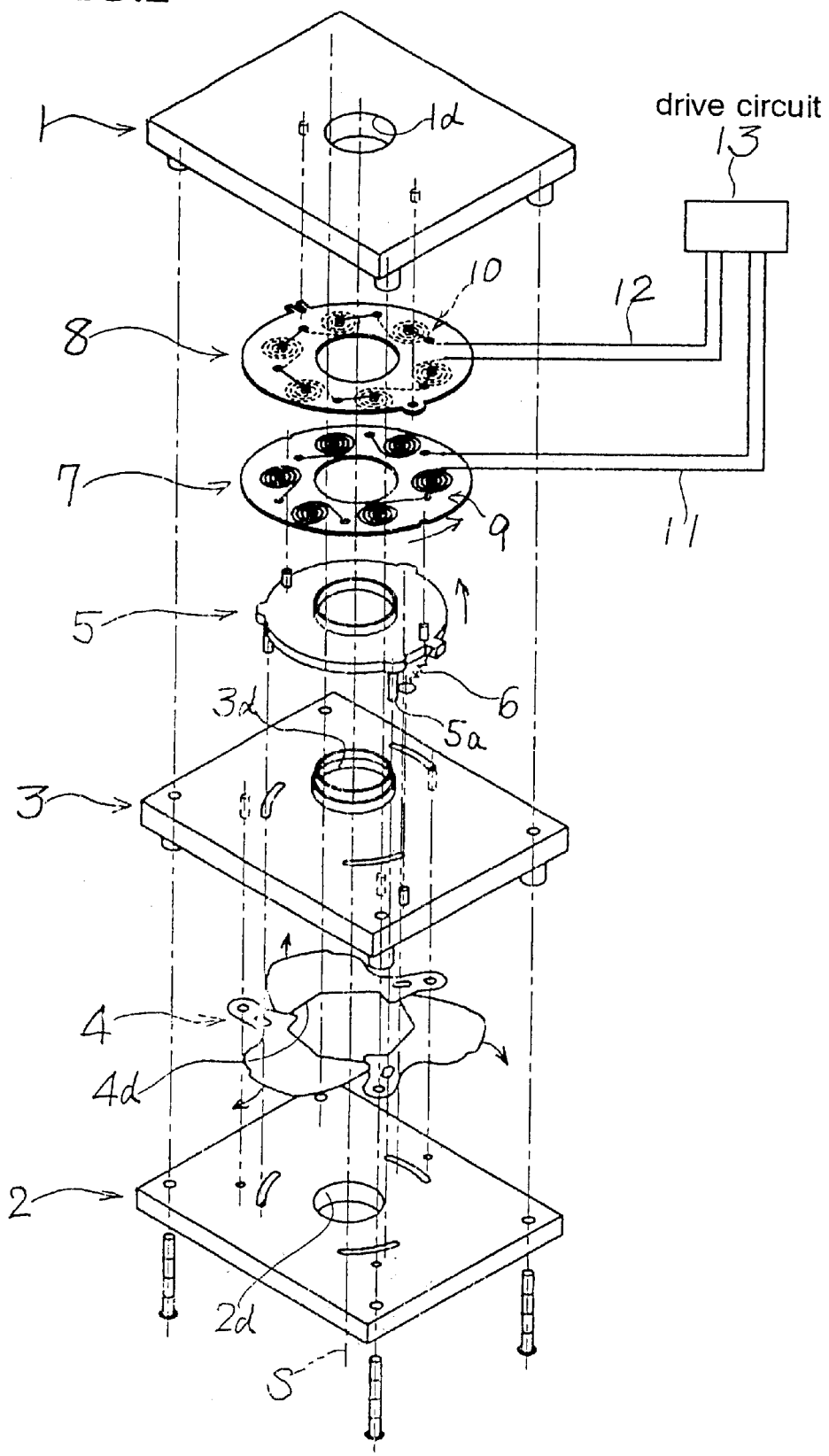
FIG. 2 is a disassembled perspective view showing a state in which a shutter is opened.

FIG. 2 shows a state in which the shutter which is closed in FIG. 1 is fully opened and respective notations stay the same as those in FIG. 1 and accordingly, only principal ones thereof are designated. The state shows that current controlled by the drive circuit 13 is flowed to the respective coil patterns 9 and 10 and the movable printed board 7 is pivoted in the counterclockwise direction. In accordance therewith, the sector ring 5 is pivoted integrally with the movable printed board 7 and the respective sectors 4 are pivoted in arrow mark directions via the drive pins 5a to thereby form the shutter aperture 4d the center of which coincides with the optical axis S. Further, when electricity is made to stop flowing to the respective coil patterns by the drive circuit 13, the movable printed board and the like can be returned to an original position by biasing force of the spring 6.

Figure 3:
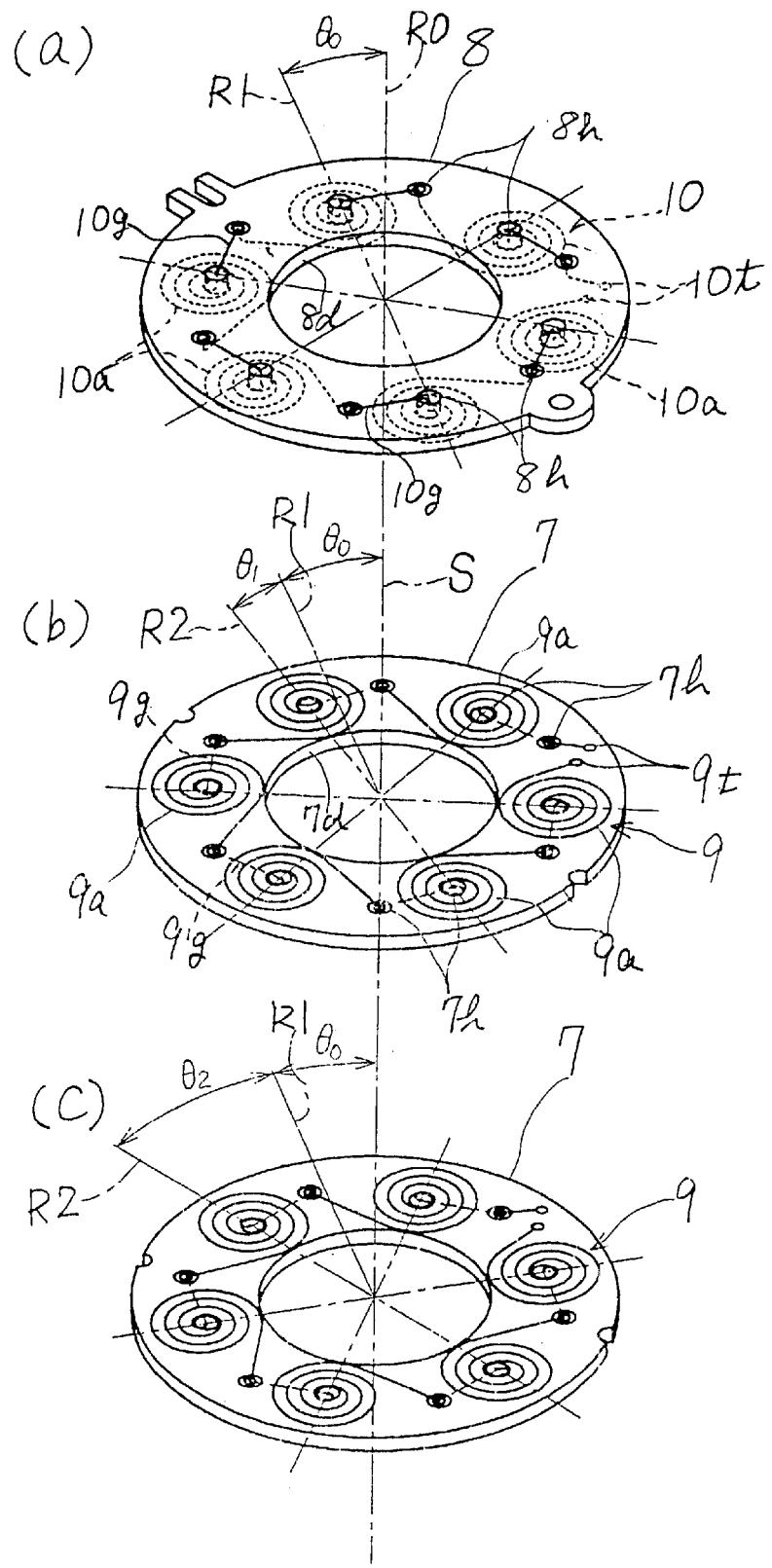

FIGS. 3A, 3B and 3C illustrate [to] enlarged portions of the movable printed board 7 and the fixed printed board 8 used in the first embodiment and a positional relationship between the both. FIG. 3A shows a state of installing the fixed printed board 8. The lower face of the fixed printed board 8 is arranged with a plurality of the coil patterns 10 in a spiral shape on radial lines R1 extended, having a predetermined radius from the optical axis S and extended from the optical axis S at equal angular intervals.

Further, FIG. 3B shows a state of attaching the movable printed board 7 and similarly to the fixed printed board, the upper face of the movable printed board 7 constituted by an insulating plate is arranged with a plurality of the coil patterns 9 in a spiral shape on radial lines R2 having a predetermined radius from the optical axis S and extended from the optical axis at equal angular intervals. In each of the coil patterns 9, current flows from an inner end portion (central portion) toward an outer end portion (outer peripheral end). That is, according to a way of winding the spiral, the spiral is directed from the inner end portion to the outer end portion in right hand winding and current flows from the inner end portion to the outer end portion (from inside to outside) in the clockwise direction. In connecting to the inner end portion of each of the spirals, the connection can be carried out by providing through holes 7h respectively at a vicinity of each of the spirals and the inner end portion of the printed board and connecting portions 9g via the through holes at one of faces of the printed board which is not confronting the other printed board.

Similarly, the respective coil patterns 10 of the fixed printed board 8 are arranged on the lower face of the board and electricity can be conducted to central portions of spirals 10a by enabling electric conduction between two faces of the board via connecting portions log provided via through holes 8h on a face of the board which is not confronting the movable printed board 7.

Further, whereas an angle of the radial line R1 radially extended from the optical axis S constituting one of references of positions of arranging the respective coil patterns 10 of the fixed printed board 8, is $\theta_0$ from a line of dividing left and right, the radial line R2 of the movable printed board 7 is disposed at an angular position advanced from $\theta_0$ further by $\theta_1$ in the counterclockwise direction. This constitutes a means adopted for making the movable printed board 7 easily pivotable by exerting repulsion forces of opposed faces of the two boards to each other in a skewed direction when electromagnetic forces having the same polarity are produced at the coil patterns 9 and 10 of the two boards in directions opposed to each other.

In this way, when the movable printed board 7 is pivoted in the counterclockwise direction by magnetic repulsion forces and the radial line R2 advances to a rotational angle of $\theta_2$, a diaphragm position determined by setting a diaphragm of a camera is reached and the movable printed board 7 is stopped. The respective displacement amount of the movable printed board at this occasion is $\theta_0-\theta_1$. In this case, when power supply is stopped by the drive circuit 13, the electromagnetic forces respectively displacing the movable printed board are extinguished, and thereby the printed board returns to an original position by the biasing force (refer to FIGS. 1, 2) of the spring 6 and the shutter is closed.

Figure 4:
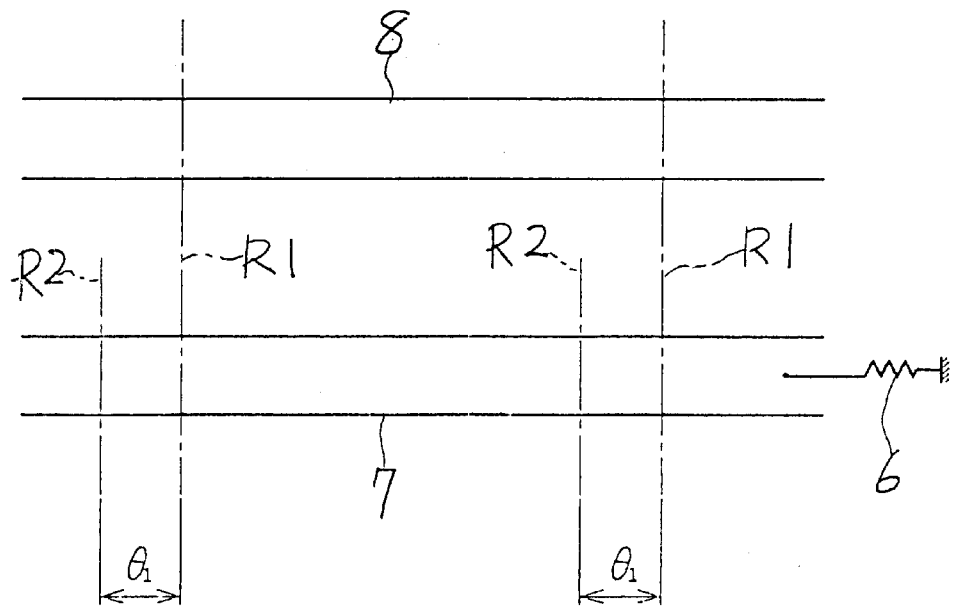
Figure 4:
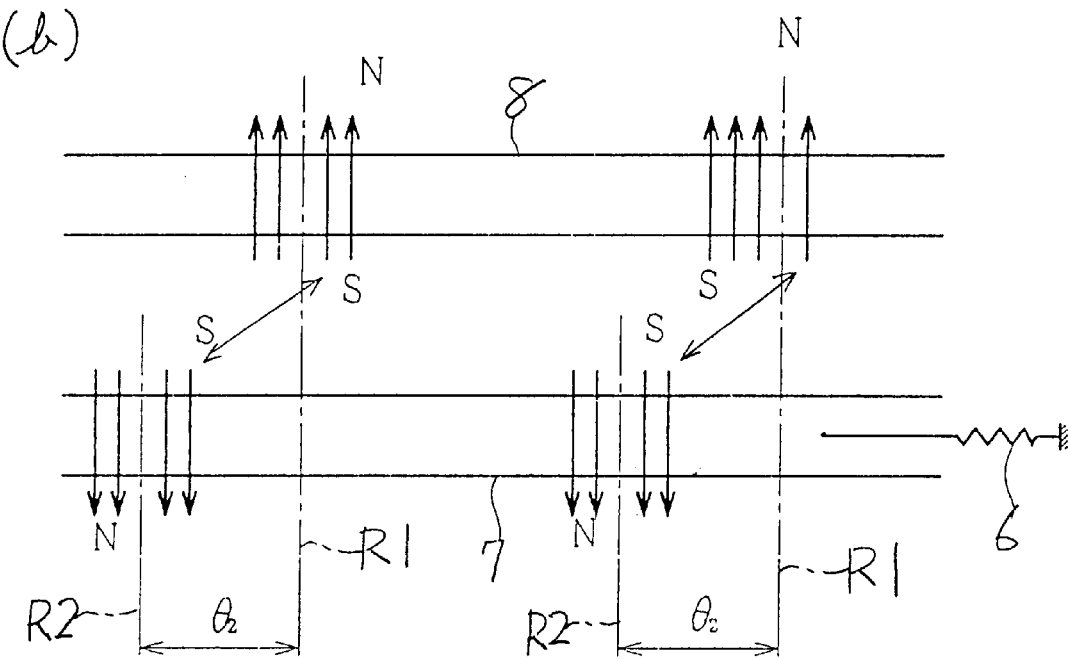

FIGS. 4A and 4B show a relationship between a deviation of the angle ($\theta$) of the radial line between the two printed boards and the drive force. FIG. 4A shows an initial position in which the radial line R2 of the movable printed board 7 is disposed at a position deviated from the radial line R1 of the fixed printed board 8 by the angle $\theta_1$. Under the state, the movable printed board 7 is stationary at the original position by the biasing force of the spring 6.

FIG. 4B shows a state in which by conducting electricity to the coil patterns of the two printed boards, electromagnetic force having an N pole on a lower side thereof is produced in the movable printed board 7, electromagnetic force having an N pole on an upper side thereof is produced in the fixed printed board 8 and by repulsion force between the S poles of the opposed faces, the radial line of the movable printed board is pivoted to an angular position constituting $\theta_2$. That is, the movable printed board 7 is displaced by an angle of $\theta_2-\theta_1$. The angular displacement is carried out against the biasing force of the spring 6 and accordingly, when the electromagnetic forces are extinguished by stopping conducting electricity, the movable printed board 7 immediately returns to the initial position by the biasing force and the shutter is closed.

Figure 5:
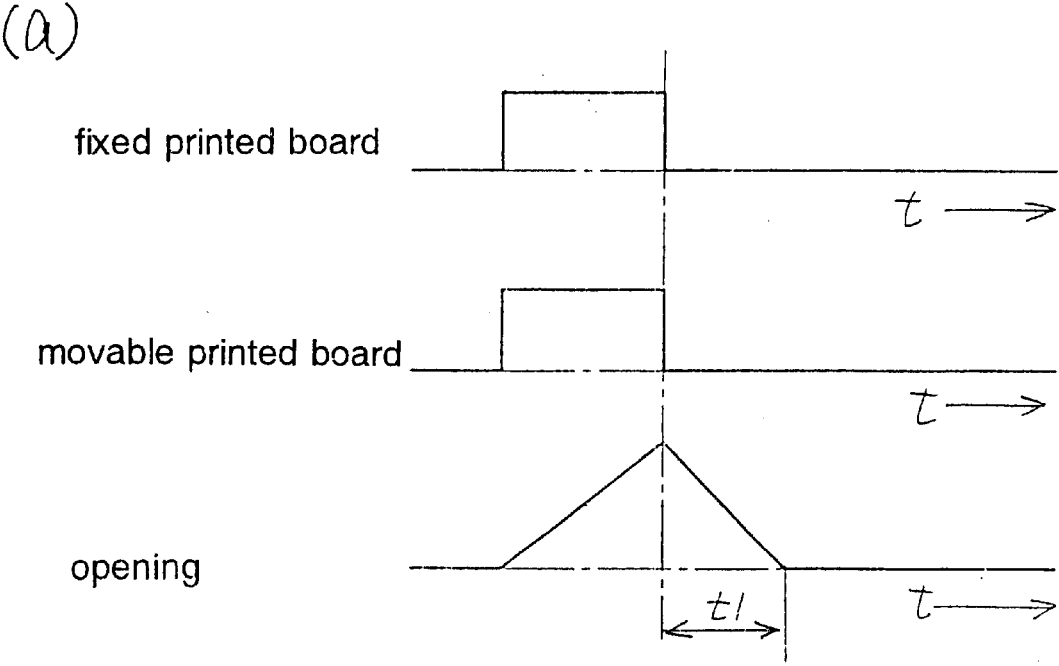
Figure 5:
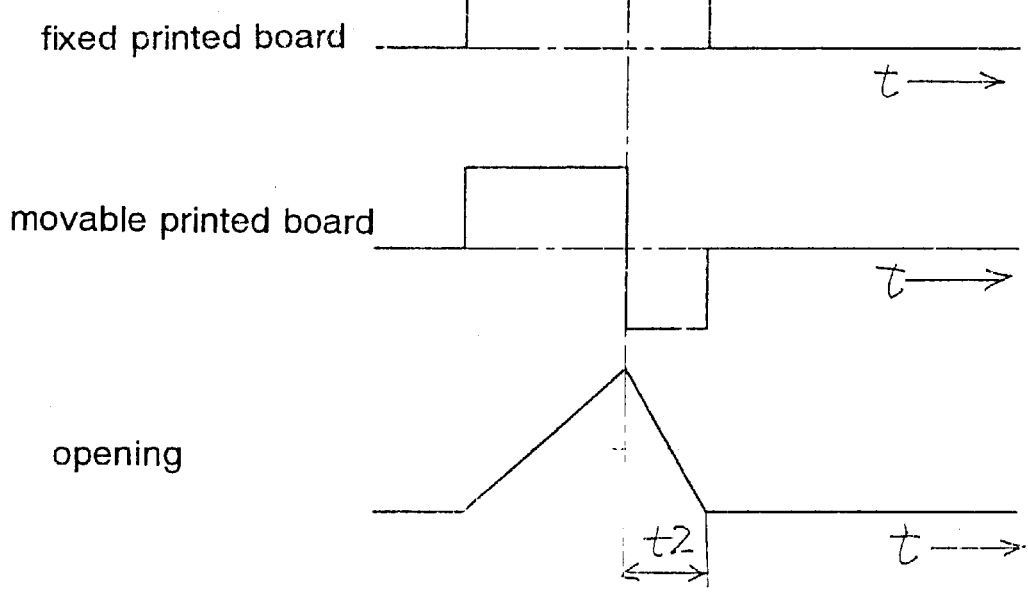

FIGS. 5A and 5B show a relationship between conduction of electricity to the two printed boards and the shutter aperture with regard to time (t). FIG. 5A shows a method of conducting electricity, described above. That is, there is shown a state in which the shutter is opened by conducting electricity to the two coil patterns of the fixed printed board 8 and the movable printed board 7 and the shutter is closed by the biasing force of the spring by stopping conducting electricity. That is, the shutter is opened by the electromagnetic forces of the coil patterns and the shutter is closed only by the biasing force of the spring after stopping conducting electricity.

In contrast thereto, according to FIG. 5B, electricity is conducted to the coil patterns of the fixed printed board 8 during an entire section of fully opening the shutter aperture to closing the shutter aperture, and the shutter is fully opened by conducting electricity to the coil patterns of the movable printed board 7 in one direction, thereafter, electricity is conducted thereto in a reverse direction to thereby exert suction force and operate force to the movable printed board to pivot in the direction of closing the shutter. As a result, the shutter can rapidly be closed by adding the attractive force to the biasing force of the spring.

Whereas in FIG. 5A, a time period for closing the shutter is t1, the time period for closing the shutter is as short as t2 in FIG. 5B in which the suction force is exerted and there can be constituted a camera having variable shutter speed. Further, the time periods of conducting electricity differ depending on a set value of the shutter diaphragm and FIGS. 5A and 5B are shown to deal with arbitrary diaphragm.

(Second Embodiment)

Figure 6:
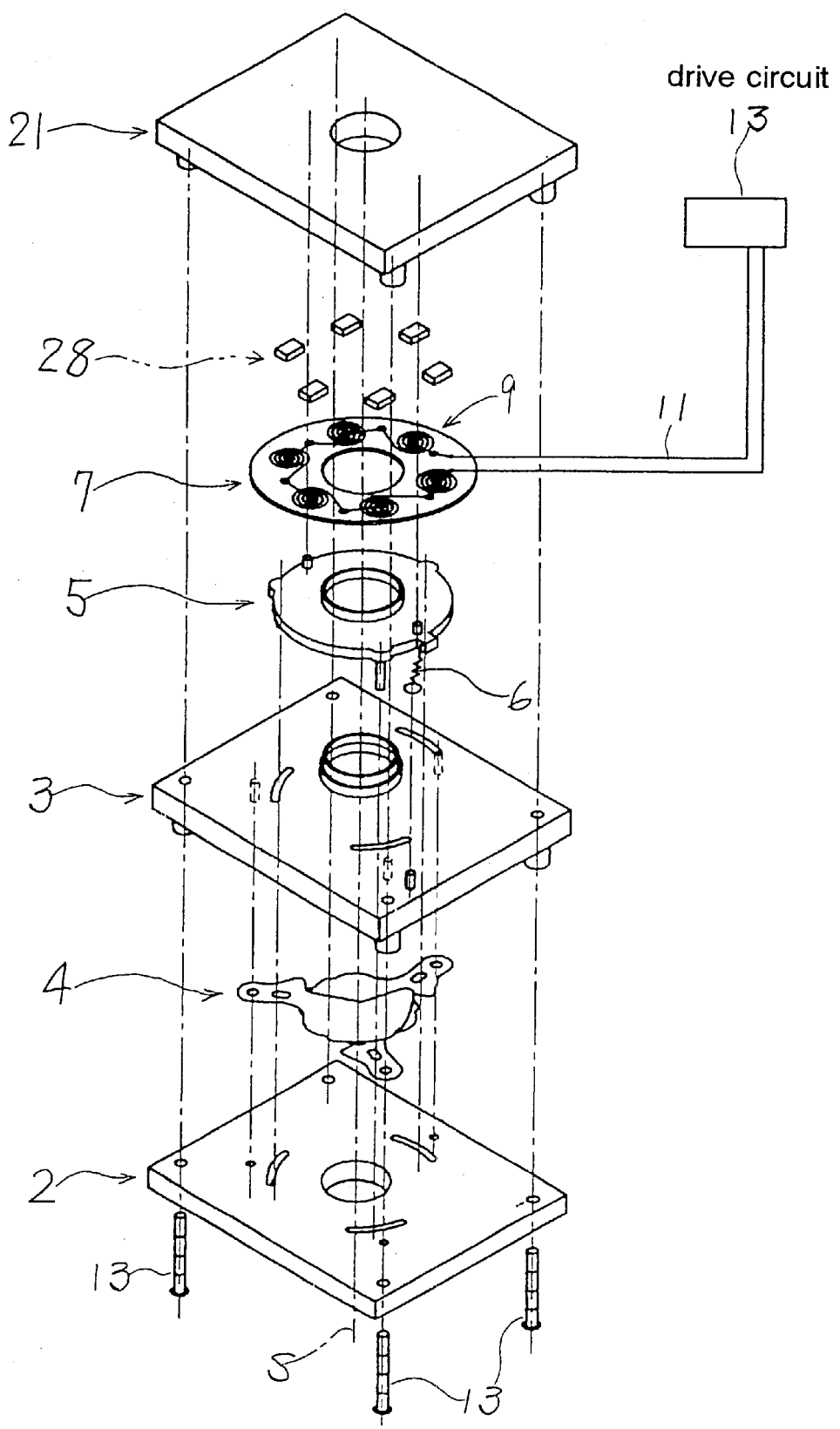
FIG. 6 is a disassembled perspective view showing a constitution of a second embodiment.

According to a second embodiment, as shown by FIG. 6, a shutter is constituted by arranging a plurality of permanent magnets 28 on a lower face of an upper plate 21 in place of the fixed printed board 8 in the first embodiment. The respective permanent magnets 28 are fixedly attached to the lower face of the upper plate centering on intersecting points of radial lines starting from the optical axis S and a radius of a predetermined length centering on the optical axis. Naturally, intervals of arranging the individual permanent magnets constitute an equal angle similarly to the case of FIG. 1. Further, the movable printed board 7 is similar to that in the case of FIG. 1 and with regard to arrangement of the coil patterns 9, similarly to the case of the first embodiment, the coil patterns 9 are arranged at angular positions in which the radial lines are deviated from positions of arranging the respective permanent magnets 28 by $\theta_1$ (refer to FIGS. 3A, 3B, 3C, 4A and 4B).

According to the second embodiment, the fixed printed board is not provided and accordingly, a constitution including wirings can be simplified since the permanent magnets need not be connected to the drive circuit 13. Further, power conservation is achieved since electricity is conducted only to the movable printed board. Other constitution is similar to that in the first embodiment.

(Third Embodiment)

A third embodiment is constituted by arranging pluralities of coil patterns in a spiral shape in a connected state on both faces of the movable printed board 7 and the fixed printed board 8 according to the first embodiment.

Figure 7:
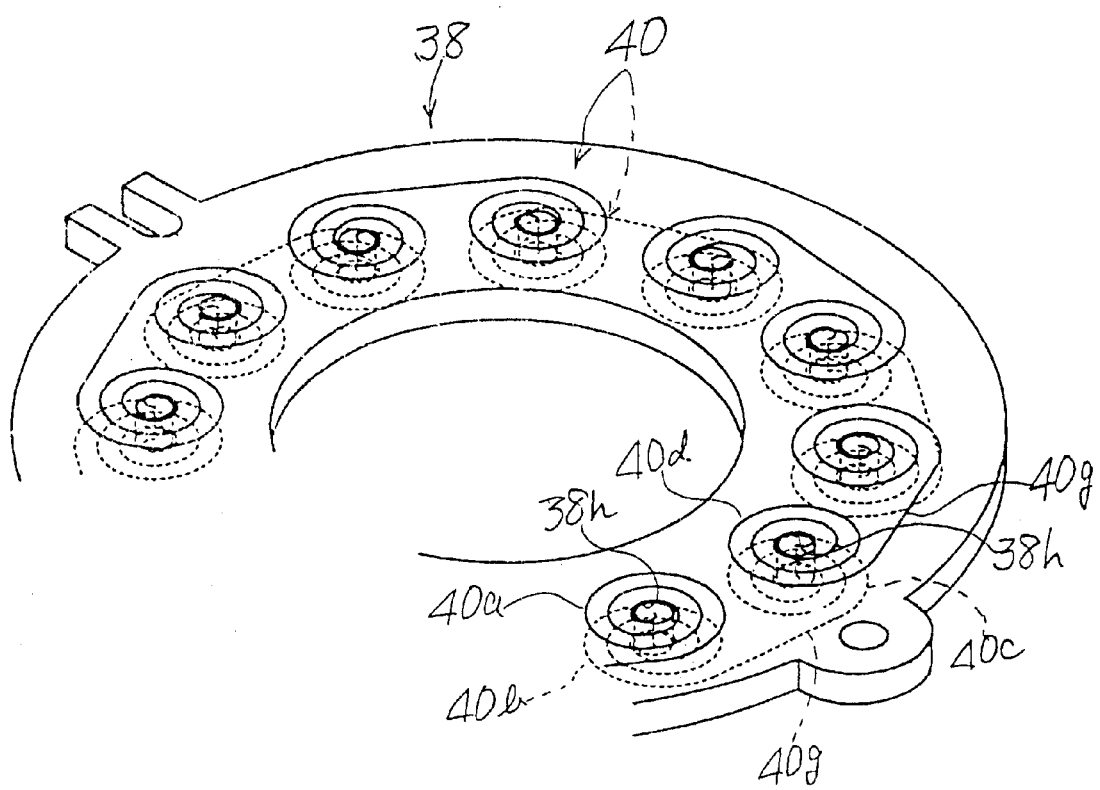
FIG. 7 is a perspective view showing coil patterns of a fixed printed board according to a third embodiment.

FIG. 7 is illustrated to enlarge a fixed printed board 38 according to the third embodiment. As illustrated, two faces of the fixed printed board 38 are respectively provided with pluralities of coil patterns 40 in a spiral shape. All of the coil patterns 40 are constituted such that current flows in the same direction. For example, according to a spiral 40*a* disposed on an upper face on the frontmost side of the drawing, is provided such that the spiral advances in lefthand winding (counterclockwise direction) from outside to inside and is connected to a coil pattern 40*b* on a lower face side via a through hole 38*h*. Further, the spiral 40*b* on the lower face side constitutes a spiral in lefthand winding from inside to outside in view from above. Accordingly, when electricity is conducted to the spirals 40*a* and 40*b* of the coil pattern, there are produced electromagnetic forces having a polarity with an N pole on an upper side from both. According to the coil patterns, the respective spirals of the two faces are respectively provided to overlap at two faces of the fixed printed board 38 and accordingly, intensities of the electromagnetic forces produced by the both are synthesized to be about twice as much as that in the case of the first embodiment.

Further, an outer end portion of the spiral 40*b* on the lower face is connected to a spiral 40*c* on the lower face disposed at a second position from the front side via a connecting portion 40*g* on the lower face. The spiral 40*c* is constituted in lefthand winding from outside to inside via the connecting portion 40*g* and is connected to an inner end portion of a spiral 40*d* at a second position provided on the upper face via the through hole 38*h* at central portions thereof. The spiral 40*d* at the second position on the upper face is constituted in lefthand winding from inside to outside and an outer end portion thereof is connected to an outer end portion of a third spiral 40*e* on the upper face via the connecting portion 40*g*. The spiral 40*e* is the same as the first coil pattern 40*a* on the upper face and thereafter, similar spirals are repeatedly provided.

Although not illustrated, coil patterns having similar spirals in left hand winding are provided also on two faces of the movable printed board and the twice electromagnetic forces are similarly produced. Other constitution is the same as that in the first embodiment.

Figure 8:
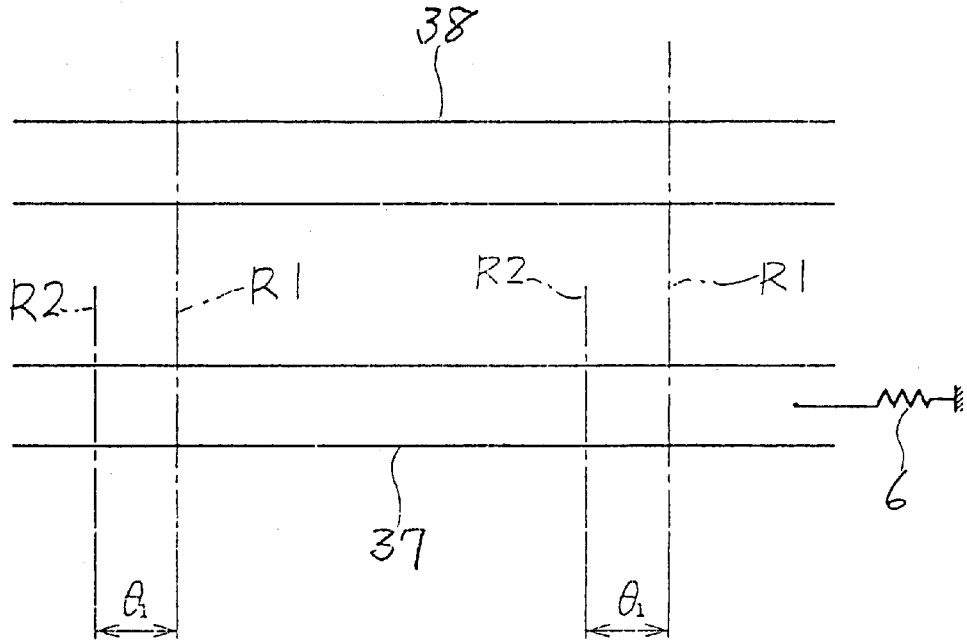
Figure 8:
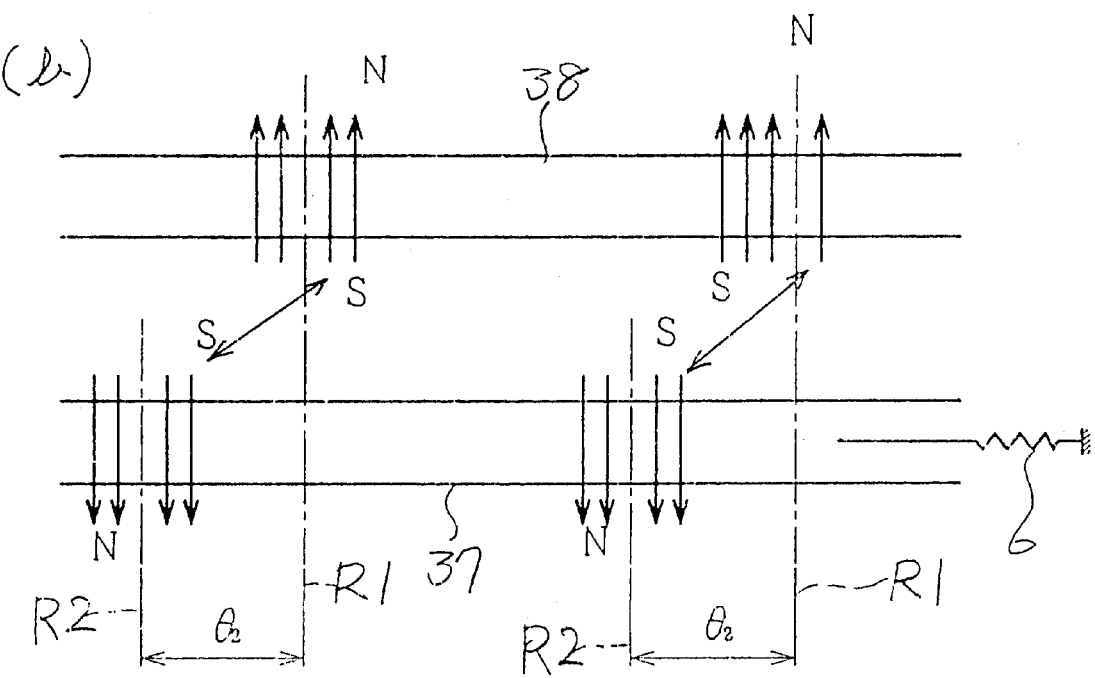

FIGS. 8A and 8B show a positional relationship between the fixed printed board 38 and the movable printed board 37 according to the third embodiment in which FIG. 8A is the same as FIG. 4A and FIG. 8B is illustrated similarly to FIG. 4B, however, intensities of the electromagnetic forces are twice as much as those in FIG. 4B.

(Fourth Embodiment)

A fourth embodiment is constituted by modifying the third embodiment and alternately arranging coil patterns having ways of winding contiguous spirals in directions opposed to each other.

Figure 9:
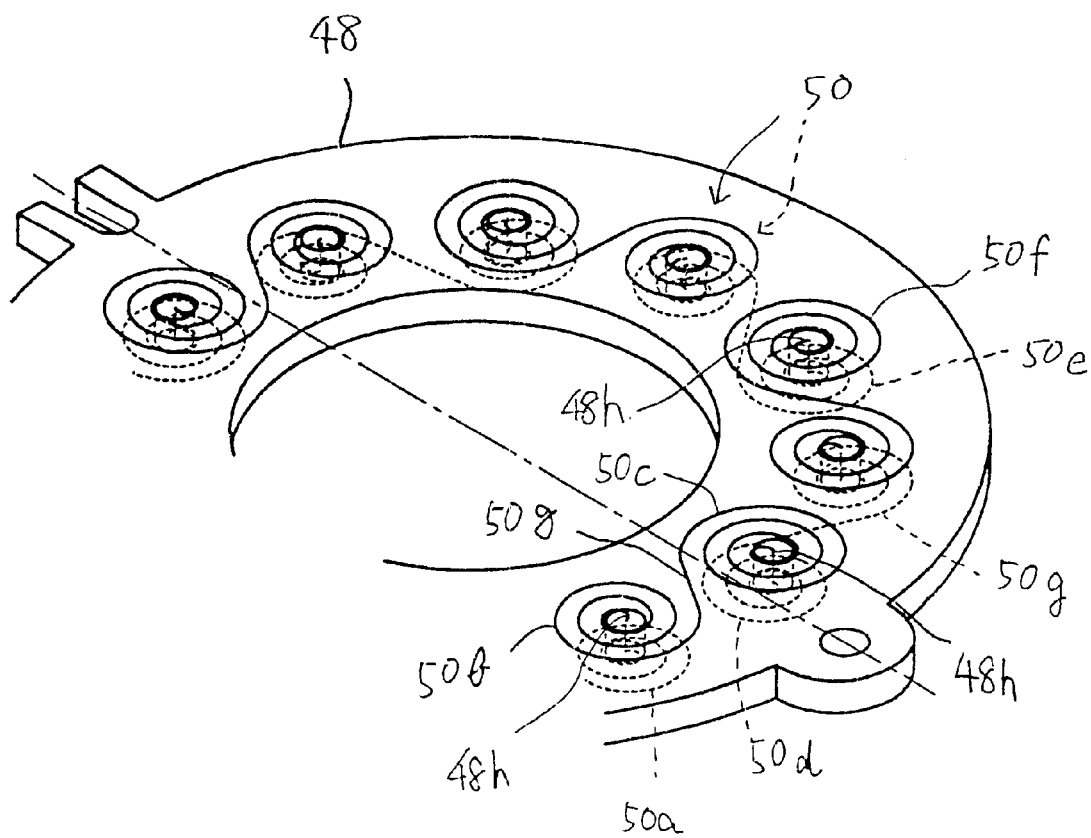
FIG. 9 is a perspective view showing coil patterns of a fixed printed board according to a fourth embodiment.

FIG. 9 illustrates a fixed printed board 48 according to the fourth embodiment. In the drawing, for example, a spiral 50*a* on the lower face disposed on the front most side is constituted in lefthand winding from outside to inside and an inner end portion thereof is connected to an inner end portion of a spiral 50*b* on the upper face via a through hole 48*h*. Further, the spiral 50*b* on the upper face is constituted in lefthand winding from inside to outside and an outer end portion thereof is connected to an outer end portion of a spiral 50*c* on the upper face at a second position via a connecting portion 50*g*.

The spiral 50*c* on the upper face at the second position is constituted in righthand winding from outside to inside and an inner end portion thereof is connected to an inner end portion of a second spiral 50*d* on the lower face via the through hole 48*h*. The second spiral 50*d* on the lower face is constituted in righthand winding from inside to outside and an outer end portion thereof is connected to an outer end portion of a third spiral 50*e* on the lower face via the connecting portion 50*g*. The spiral 50*e* is the same as the first spiral 50*a* on the lower face and a spiral 50*f* on the upper face is the same as the first coil pattern 50*b* on the upper face.

In this way, according to the coil pattern of the embodiment, although directions of conducting electricity on the upper face and the lower face in a relationship of overlapping each other at the two faces of the printed board, are the same, ways of winding the spirals of the coil patterns in a contiguous relationship are opposed to each other. Therefore, according to electromagnetic forces produced by conducting electricity thereto, ones producing N poles in the same direction and ones producing S poles in the same direction are arranged alternately.

Similar coil patterns are arranged also on the movable printed board and when a relationship for arranging the two printed boards is made similar to that in the third embodiment, the spiral of the movable printed board disposed on a front side in an advancing direction relative to the spiral of the first coil pattern of the fixed printed board, produces magnetic forces having the same polarity therebetween. Therefore, the spiral on a rear side in the advancing direction relative to the spiral of the first coil pattern of the fixed printed board, produces electromagnetic forces having different polarities therebetween and accordingly, the movable printed board is simultaneously exerted with repulsion force and attractive force for advancing the movable printed board along the advancing direction and accordingly, the shutter can be opened at high speed.

Figure 10:
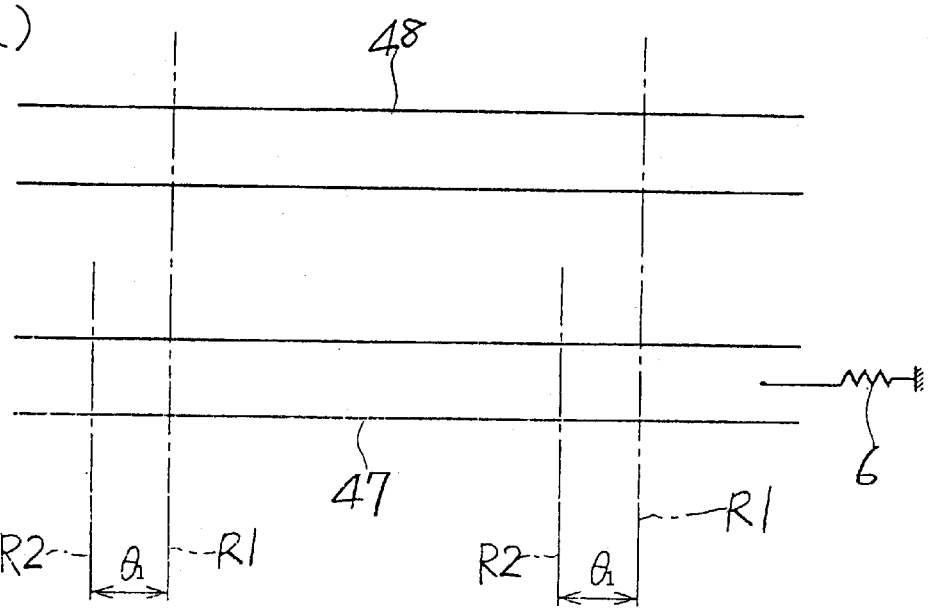
Figure 10:
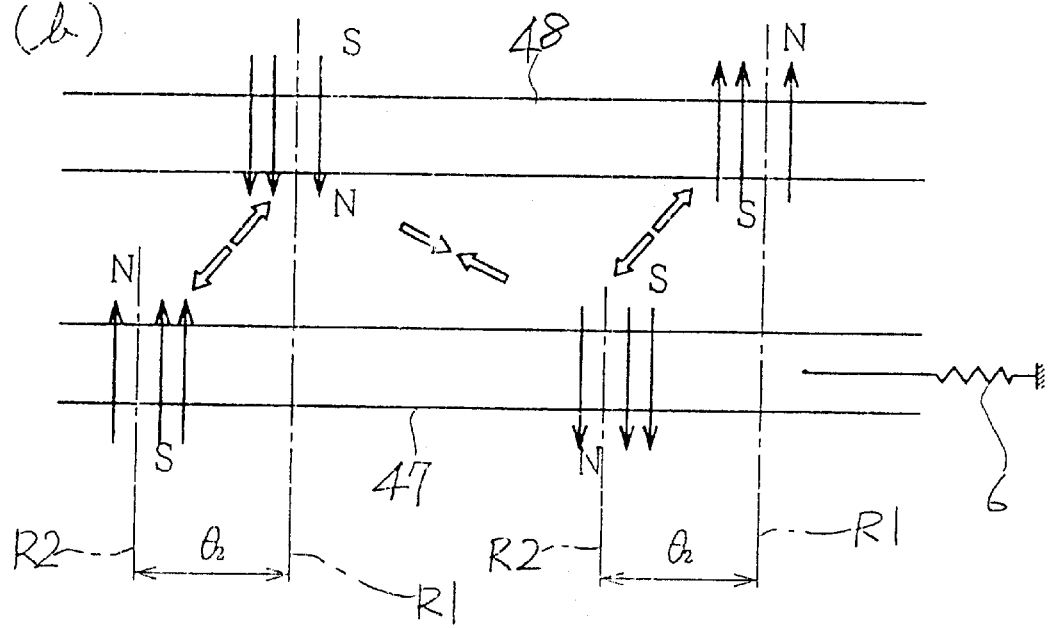
Figure 11:
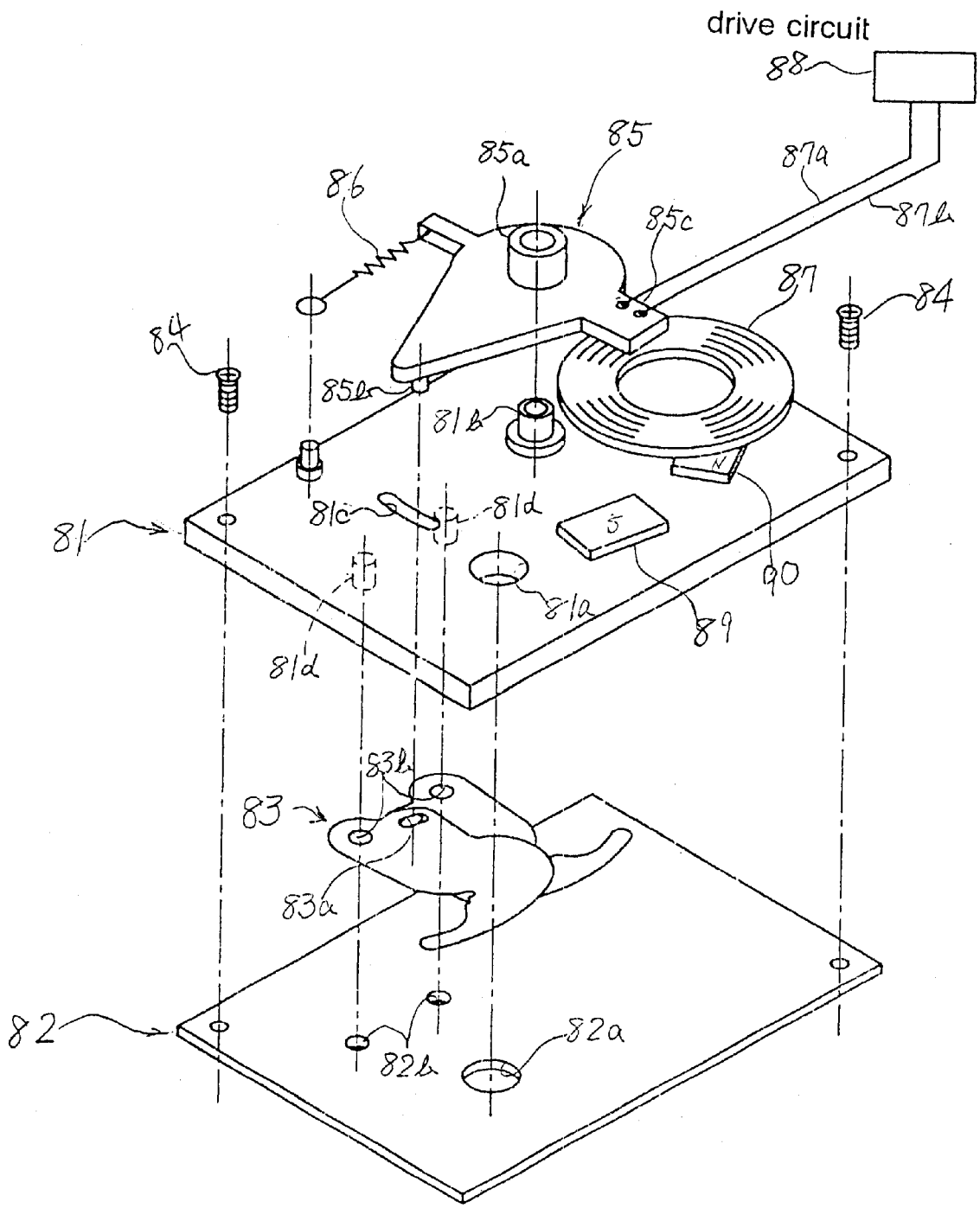
FIG. 11 is a disassembled perspective view showing a constitution of a conventional technology.

FIGS. 10A and 10B show these relationships and FIG. 10A shows a deviation of an angle of the radial line constituting a central position of the spiral of the coil pattern in the initial state similarly to the case of the third embodiment. That is, there is brought about a state in which a movable printed board 47 is biased by the spring 6 to a position deviated in a advancing direction by $\theta_1$ relative to the fixed printed board 48. FIG. 10B shows polarities and advancing states of the respective coil patterns in conducting electricity, mentioned above. That is, by conducting electricity to the coil patterns of both, directions of respective polarities are opposed to each other since the spirals of contiguous ones of the coil patterns are constituted in such winding directions. Thereby, the movable printed board 47 is simultaneously exerted with repulsion force and suction force in the advancing direction and the radial line R2 is moved to a position remote from the radial line R1 in the initial state by the angle $\theta_2$ in the advancing direction.

Further, according to the embodiment, similarly to the first embodiment, the coil patterns can also be arranged only on faces of the respective printed boards opposed to each other. Further, according to the embodiment, a similar effect can also be achieved by arranging permanent magnets on the upper plate as in the second embodiment in place of the fixed printed board. In this case, polarities of electromagnetic forces produced by the permanent magnets and the coil patterns on the opposed faces must naturally be reversed alternately as in this embodiment.

Although according to any of the first through the fourth embodiments, a number of installing the coil patterns, a number of winding the spiral and a number of the layers are illustrated to be able to determine from the drawings, these numbers can arbitrarily be determined. Further, although an explanation has been given such that a number of the sectors is three, the number can also be determined arbitrarily. Further, the fixed printed board and the movable printed board may be constituted by multilayer printed boards and in the case of the multilayer printed boards, the coil patterns can further be increased and strong magnetic forces can be produced. Further, there may be constructed a constitution in which the fixed printed boards are provided at two locations of the upper plate and the lower plate. Further, although according to the embodiments the movable printed board and the sector ring are provided by separate members, the movable printed board may be provided with sector driving pins to thereby make the movable printed board serve as the sector ring. Further, the coil patterns may not be aligned precisely in a circular shape but may be arranged substantially in a circular shape. Further, the fixed printed board may be provided at the lower plate to thereby constitute the lower plate a supporting plate and the movable printed board may be provided on the lower face of the sector ring.

According to the invention, the shutter can be downsized and speed of opening and closing the shutter can be accelerated. Further, power consumption can be reduced since the capacity of the movable portion is reduced. Thereby, a camera having a small size and high function can be provided inexpensively.

What is claimed is:

1. A shutter for a camera comprising:
   a supporting plate having an opening therethrough;
   a fixed printed board held by the supporting plate and provided with an opening therethrough, and having a plurality of coil patterns disposed thereon substantially in a concentric shape relative to a center of an optical axis of the opening, each coil pattern having a spiral shape;
   a shutter base plate having an opening therethrough;
   a movable printed board having one face confronting one face of the fixed printed board and being pivotably supported by the shutter base plate and having an opening therethrough, and a plurality of coil patterns disposed thereon substantially in a concentric shape relative to a center of an optical axis of the opening, each coil pattern having a spiral shape;
   a biasing member for biasing the movable printed board in one direction; and
   a plurality of sectors engaged to undergo pivotal movement with the movable printed board so as to open and close in response to pivoting of the movable printed board; and
   a drive circuit connected to the coil patterns for controlling the supply of electricity to the coil patterns such that repulsive magnetic forces are generated while opening the shutter and attractive magnetic forces are generated while closing the shutter.

2. A shutter for a camera according to claim 1; wherein the fixed printed board and the movable printed board have through holes therein, respective coil patterns are arranged on confronting faces of the respective printed boards, and connecting portions for connecting terminals with the coil patterns and for connecting the respective coil patterns are provided on faces of the printed boards which are not confronting each other and are connected to the coils via the through holes.

3. A shutter for a camera according to any one of claims 1 or 2; wherein the respective coil patterns are equally spaced about confronting faces of the respective printed boards and, in an initial state, positions of the respective coil patterns of the movable printed board are deviated from positions of the respective coil patterns of the fixed printed board in an advancing direction by a predetermined angle.

4. A shutter for a camera according to any one of claims 1 or 2; wherein the respective printed boards comprise multilayer printed boards each having at least two or more faces, and coil patterns wound in the same direction are arranged on at least two or more faces.

5. A shutter for a camera according to any one of claims 1 or 2; wherein contiguous ones of the coil patterns on the respective printed boards are wound in opposite directions.

6. A shutter for a camera, comprising:
   a supporting plate having an opening therethrough;
   a plurality of permanent magnets arranged on the supporting plate;
   a shutter base plate having an opening therethrough;
   a movable printed board having one face confronting the permanent magnets pivotably supported by the shutter base and having an opening therethrough, and having a plurality of coil patterns disposed thereon substantially in a concentric shape relative to a center of an optical axis of the opening, each coil pattern having a spiral shape;
   a biasing member for biasing the movable printed board in one direction;
   a plurality of sectors engaged to undergo pivotal movement with the movable printed board so as to open and close in response to pivoting of the movable printed board; and
   a drive circuit connected to the coil patterns for controlling the supply of electricity to the coil patterns such that magnetic forces between the coil patterns and the permanent magnets repel each other while opening the shutter and attract each other while closing the shutter.

7. A shutter for a camera according to claim 6; wherein the permanent magnets are alternately arranged with N poles and S poles and contiguous coil patterns of the movable printed board are wound in opposite directions.

8. A shutter for a camera according to any one of claims 6 or 7; wherein the coil patterns are arranged on opposite faces of the movable printed board.

9. A shutter for a camera according to any one of claims 1 or 6; wherein the drive circuit controls the supply of electricity to the coil patterns in accordance with a brightness of an object to be photographed.

10. A shutter for a camera according to claim 1; wherein the biasing member biases the movable printed board so that the coil patterns disposed thereon are deviated from the coil patterns disposed on the fixed printed board at an initial position by a predetermined angle by a biasing force of the biasing member.

11. A shutter for a camera according to claim 1; wherein each of the printed boards comprises a multilayer printed circuit board having at least two or more faces, the respective coil patterns are arranged on opposite faces of the respective printed boards, and the respective coil patterns formed on the respective faces of the printed boards are wound in the same direction and connected to each other.

12. A shutter for a camera according to claim 1; wherein the fixed printed board comprises a disk-shaped printed circuit board having the coil patterns printed thereon and the opening formed therein is in alignment with the openings formed in the supporting plate, the shutter base plate and the movable printed board.

13. A shutter for a camera according to claim 12; wherein the movable printed board comprises a disk-shaped printed circuit board having the coil patterns printed thereon and the opening formed therein is in alignment with the openings formed in the supporting plate, the fixed printed board and the shutter base plate.

14. A shutter for a camera according to claim 1; wherein the openings formed in the supporting plate, the shutter base plate, the fixed printed board and the movable printed board are in alignment.

15. A shutter for a camera, comprising: a base plate; a movable plate pivotably supported by the base plate and having magnetic field generating elements disposed on at least one surface thereof; one or more sector members engaged to the movable plate to undergo pivotal movement therewith to open and close a shutter aperture of the camera; a fixed plate confronting the movable plate and having one or more magnetic field generating elements disposed on at least one surface thereof confronting the magnetic field generating elements disposed on the movable plate, the magnetic field generating elements formed on at least one of the movable plate and the fixed plate comprising a plurality of coil patterns for generating a magnetic field in response to a current passing therethrough, the coil patterns being wound in the shape of spirals and being connected to each other such that an inner turn of one spiral is connected to an outer turn of an adjacent spiral; and a drive circuit for selectively supplying a current to the electromagnets to produce a repulsive magnetic field to cause the movable plate to pivot with respect to the fixed plate to open the aperture defined by the sector members and to produce an attractive magnetic field to cause the movable plate to pivot with respect to the fixed plate to close the shutter aperture defined by the sector members.

16. A shutter for a camera according to claim 15; wherein the coil patterns are all wound in the same direction, and the drive circuit supplies current to the coil patterns in a first direction to produce a repulsive magnetic field between the fixed plate and the movable plate to open the sector members when opening the shutter and supplies current to the coil patterns in a second direction to produce an attractive magnetic field between the fixed plate and the movable plate to close the sector members when closing the shutter.

17. A shutter for a camera according to claim 15; wherein the movable plate comprises a disk-shaped printed circuit board having an opening in a center thereof in alignment with the shutter aperture of the camera, and having a plurality of coil patterns printed thereon in a concentric arrangement relative to the opening formed therein.

18. A shutter for a camera according to claim 17; wherein the fixed plate comprises a disk-shaped printed circuit board having an opening in a center thereof in alignment with the shutter aperture of the camera, and having a plurality of coil patterns printed thereon in a concentric arrangement relative to the opening formed therein.

19. A shutter for a camera according to claim 15; wherein the magnetic field generating elements disposed on the fixed plate comprise a plurality of permanent magnets.

20. A shutter for a camera according to claim 15; further comprising a biasing member for biasing the movable plate so that the coil patterns disposed thereon are deviated by a predetermined angle from the magnetic field generating elements disposed on the fixed plate.

* * * * *